Sept. 10, 1968  S. M. TERRY  3,401,128
POLYURETHANE FOAM PRODUCT AND METHOD OF MAKING SAME
Filed Feb. 8, 1965
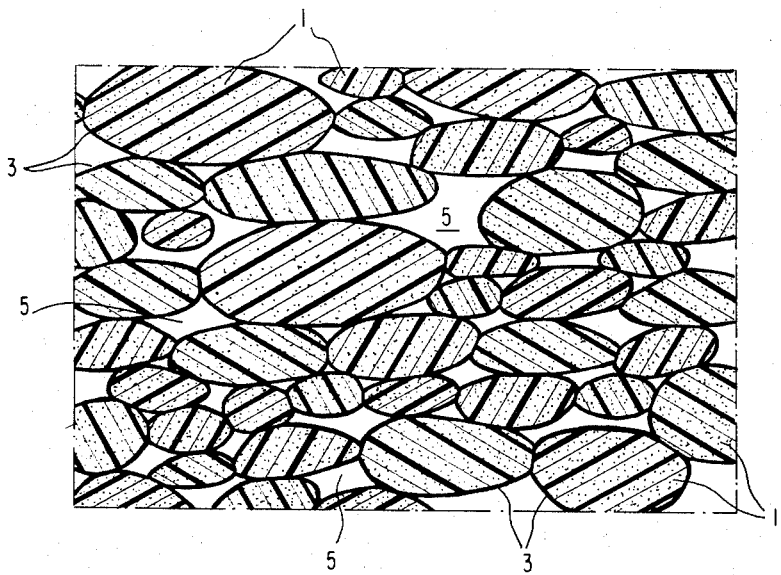
INVENTOR
SAMUEL M. TERRY
BY Beaman & Beaman
ATTORNEYS

United States Patent Office 3,401,128
Patented Sept. 10, 1968

3,401,128
POLYURETHANE FOAM PRODUCT AND
METHOD OF MAKING SAME
Samuel M. Terry, Ann Arbor, Mich., assignor to Hoover Ball and Bearing Company, Saline, Mich., a corporation of Michigan
Filed Feb. 8, 1965, Ser. No. 430,890
7 Claims. (Cl. 260—2.5)

ABSTRACT OF THE DISCLOSURE

A polyurethane foam product and method for making the product wherein comminuted polyurethane foam particles are coated with a solid, nonfoam polyurethane material producing bonding between the foam particles, the foam particles being in compression in a common direction.

---

It is an object of the present invention to provide polymeric foam products and methods of making the same, which have deflection characteristics under load that are different from those of any products produced heretofore.

Another object of the present invention is the provision of polymeric foam products having special directional properties.

A further object of the present invention is the provision of polymeric foam products and methods of making the same, characterized by reduced density as compared to comparable products that have been produced heretofore.

Still another object of the present invention is the provision of polymeric foam products and methods of making the same, characterized by greater density at lower cost than any produced heretofore.

It is also an object of the present invention to provide a polymeric foam product which can be made largely of scrap or waste foam, thereby to reclaim and convert the same into useful products.

Finally, it is an object of the present invention to provide such polymeric foam products, characterized by low cost and improved physical properties, and to provide methods for making the same which will be safe, inexpensive, dependable and easy to practice.

Other objects and advantages of the present invention will become apparent as the following description proceeds.

Briefly, the present invention is the discovery that a new polymeric foam product can be produced by creating what is in effect a foam within a foam. The outer or larger foam contains within each of its chambers a body of inner or smaller foam, and the inner foam is maintained permanently in compression in its chamber. The foam product of the present invention is thus permanently in compression and remains in that state with no external restraint. At the same time, the outer or larger foam is characterized by chambers most of which are flattened in one direction, so that the foam has directional properties and resists externally applied deformational force in various ways depending on the direction from which the external force is applied.

The method of making the new polymeric product of the present invention broadly comprises forming on the surface of shredded or comminuted polymeric foam, which preferably is waste or scrap foam, a liquid mixture of a polyfunctional reactive hydrogen compound and an organic polyisocyanate, then assembling a quantity of those coated particles in a body and compressing the body to a substantially smaller volume by application of a unidirectional force and in the substantial absence of water. The coatings on the particles cure without the formation of a foam and form an outer lattice or network of solid polyurethane material of substantially continuous phase with a quantity of polymeric foam in compression in each of a plurality of chambers thereof. The compression can be discontinued prior to the time that the coated particles are caused to occupy all of the free space within the body of particles, whereupon certain of the chambers thus formed in the larger or outer lattice will be occupied not by the inner or smaller foam but rather by the ambient atmosphere such as air or other gas. It is thus possible, despite the compression of the body of particles, to produce a foamed product which nevertheless has a lower density than the foam particles prior to compression. On the other hand, the compression of the particles until there are substantially no free spaces between them results in a product having a greater density than the uncompressed particles and in which substantially all the chambers of the larger or outer lattice are occupied by the inner or smaller foam.

The particles of scrap or waste foam with which the present invention can most advantageously and most economically be practiced have highly irregular shapes. However, their mean or average shape tends to be spherical. Compression of the body of such particles in one direction tends to flatten the mean or average shape into an oblate spheroid or even into a disk. Depending on their original shape and orientation, certain particles will of course not become flattened on compression; but the majority of the particles will tend to be flattened perpendicular to the direction of application of the compressive force. Moreover, the polyurethane material of the larger or outer lattice will cure or set during compression, with or without the application of external heat, so that upon release of the unidirectional compressive pressure, the product of the present invention will remain in compression without substantial elastic recovery, thanks to the setting of the outer lattice in the compressed or flattened position.

The modulus of elasticity of a solid substance is ordinarily taken to be a constant. However, this is true only in connection with very small deflections under load, applied to a previously undeflected material. But in the case of a foamed product, in which the deflections or crushing of the foam can amount to a substantial proportion of the thickness of the foamed article, the modulus of elasticity varies greatly. Generally, the modulus rises with compression, so that a deflection or crushing of a body of foam is resisted least by the relatively uncompressed foam and most by the relatively highly compressed foam. In other words, the slope of a stress-strain curve tends to be least for low stress-low strain and greatest for high stress-high strain.

The new product of the present invention not only has a relatively high modulus of elasticity in the direction the foam was compressed during formation, but also it has a lower rate of increase of modulus of elasticity as compared to a foam having the same initial modulus but which was formed according to prior art methods. In addition, the modulus with regard to compression or crushing in a direction at right angles to the direction of compression during forming will be distinctively different not only from the modulus and rate of change thereof of the same article in another direction but also from the modulus and rate of change thereof for other foamed bodies produced according to the prior art. In other words, not only will the properties of the foamed article of the present invention be different from each other in different directions, but also the rate of change of those properties will be different from the rate of change of the properties of foamed articles produced according to the prior art.

The present invention is not to be confused with the method and product of Einhorn et al. Patent No. 3,114,722, Dec. 17, 1963. In that earlier patent, a body of particles of comminuted or shredded scrap foam is made into a unitary product by the use of a polyurethane binder, but there the similarity to the present invention ends. In the Einhorn process, the binder is foamed and fully occupies the interstices between the particles. The particles are thus linked together by a mechanical network of foam. Moreover, the Einhorn product is uncompressed and has substantially the same density as the scrap from which it was made. As a result, the Einhorn product has no directional properties, and there is no obvious way to vary the density of the Einhorn product.

Most basically, the Einhorn method differs from that of the present invention in that the bonding of the present invention is carried out under unidirectional compression of the body of particles of comminuted foam, and also in that the binder material of the present invention is not foamed, that is, the process is carried out in the substantial absence of water which otherwise would react with the polyisocyanate component of the binder to produce the foaming reaction usually induced in polyurethane foam.

Apart from these principal distinctions, the process variables can be largely as set forth in the Einhorn patent, to which extensive reference may be had so as to avoid the unnecessary inclusion in the present application of a great deal of technical subject matter that is already well known to persons skilled in this art. Thus, the expanded cellular material which is shredded for use as the inner or smaller foam may be as in the Einhorn patent, as also the polyurethane binder material apart from the inclusion of water. Thus, the polyfunctional reactive hydrogen compound and the organic polyisocyanate reactive with the active hydrogens of the polyfunctional compound can be as set forth in the Einhorn patent, column 2, line 54, through column 4, line 28.

In addition to the Einhorn material, however, it should be noted that not only the prepolymers described in that earlier patent may be employed as the binder to form the outer or larger lattice, but also the polyurethane material can be formed in a "one shot" method, that is, by mixing the polyisocyanate and the active hydrogen compound substantially concurrently with their application to the particles of shredded foam. Furthermore, for purposes of the present invention, it is preferable that the shredded or particulate preformed foam particles have a diameter of about 1–25 millimeters. It is preferred that the binder be used in an amount between about 5–20% by weight of the comminuted foam, preferably about 7–15%, and most preferably around 10%. Below about 5%, the bond between the particles of shredded foam is too weak, while above about 20%, there is no worthwhile improvement in the properties of the product and the expense of the bonding material renders the cost of the product uneconomically high.

Application of the binder to the particles of foam can be by any desired method, preferably by spray coating during agitation of the particles. The prepolymer can be sprayed from any of a variety of conventional spray guns used for plastic coating applications; while the "one shot" system of binder can be sprayed using a two component spray gun as in Gusmer et al. Patent No. 2,890,836, June 16, 1959. The temperature of application of the binder is unimportant, apart from the use of temperature to control viscosity. Solvents and flow control agents can of course be incorporated in the binder for ease of application.

In the binder, an excess of polyisocyanate is used, at least sufficient for a minimum of about two percent unreacted isocyanato groups by weight based on the binder as a whole. Considerable excess of polyisocyanate may be used, but the preferred unreacted isocyanato content is about 4–10% on the above weight basis.

Another distinctive characteristic of the present invention, as compared to the Einhorn development, is that the binder can be applied to the particles of foam a substantial time in advance of formation of the product of the present invention. The particles coated with binder are not tacky and they can be freely handled after coating without sticking to each other, for several hours at room temperature. Thus, after coating, the particles can be handled by the use of any desired equipment so as to load them into a press, without the need for special handling equipment or special techniques. It is only when the mass of coated particles is compressed, either at ambient temperature or with heat, that they adhere to each other. Also, it should be noted that the compression can be carried out either with or without external heat, the speed of bonding of course depending in large measure on whether or not heat is used.

Still another distinction between the present invention and the Einhorn procedure is that in the Einhorn procedure, the water-polyisocyanate reaction, forming amines and the carbon dioxide that produces the foam bubbles, with the amines thereafter reacting with further isocyanato groups to form urea-type linkages, proceeds much more rapidly than any other reaction, with the result that essentially all that happens in Einhorn is that the binder reacts with itself to form a self-contained foam that links only mechanically with the previously formed foam of the shredded particles. But in the present invention, in which there is no water-polyisocyanate reaction, the isocyanato groups of the binder react with the active hydrogens of the previously formed foam, thereby to bond the urethane binder to the previously formed foam with a bond that is substantially stronger than in the case of Einhorn. As a result, the strength of the product of the present invention, both in tension and in shear, is substantially greater than in Einhorn.

Practically any commonly used catalyst for the urethane reaction may be incorporated in the binder material. Stannous octoate is highly effective, as are also aliphatic tertiary amines such as triethylamine, N-methyl morpholine, N,N'-dimethyl piperazine, etc.

To enable those skilled in this art to practice the invention, the following illustrative examples are given:

Example I 1000 grams of chopped polyurethane foam, having an average particle diameter of ½", are tumbled for three minutes at room temperature with two components simultaneously sprayed thereon. The first component is 36 grams of 4,4'-diphenylmethane diisocyanate, undistilled grade. The second component is 90 grams of a mixture having the following composition.

| Component: | Parts by wt. |
| --- | --- |
| Polypropylene ether triol (3000 molecular weight) | 75.5 |
| Polypropylene ether diol (2000 molecular weight) | 25.0 |
| Catalyst of 1 part by weight of diazobicyclooctane in 2 parts by weight of diethylene glycol | 0.4 |
| N-ethyl morpholine | 1.0 |
| Stannous octoate | 0.8 |

The binder was thus 11.2% by weight of the whole.

After tumbling, the coated particles of shredded foam, which were not tacky to the touch despite the presence of the coating thereon, were loaded into a container which was square in cross section and was 15 inches on a side. The tumbled particles occupied the container to a height of 15 inches. A cover was then applied that covered all of the internal cross section of the container and that slid within the container. The cover was forced down onto the body of coated particles in the container and compressed the body from an original height of 15 inches to a compressed height of nine inches. Heat was then applied to the container for 30 minutes at 140° C. The cover was then removed and the bonded block of product of the present invention, 15" x 15" x 9", was removed as a unit from the container. It had a density of 2.0 lbs./cu. ft. and was strongly bonded into a unitary block.

Example II

Example I was repeated, except that the first component was present only in the amount of 30 grams. However, the coated particles were compressed from a height of 15 inches down to a height of 7.5 inches. The percentage of binder used was thus 10.7%. The final density was 2.3 lbs./cu. ft.; and adhesion was quite strong.

Example III

Example II was repeated, but the coated particles were compressed from a height of 15 inches down to a height of only 2.5 inches. The percentage binder was 10.7 and the final density was 7.33 lbs./cu. ft. Again, adhesion of the particles was quite strong.

Example IV

The previous examples were repeated, except 40 grams of the first component and 100 grams of the second component were used. The coated particles were compressed to 4.5 inches height, and the final product had a density of 3.85 lbs./cu. ft., with very strong adhesion between the particles. The binder percentage was 12.3.

Example V

The preceding examples were repeated, except that 15 grams of the first component and 45 grams of the second component were used, so that the weight of the binder was 5.7% of the whole. The coated particles were compressed to a height of 9 inches in the container; the density of the final material was 1.92 lbs./cu. ft. The adhesion between the particles, although suitable for many purposes, was nevertheless weaker than in the case of the preceding examples.

In the accompanying drawing, which is an enlarged fragmentary cross-sectional view of the product of the present invention, the particles of scrap polymeric foam are shown at 1; the binder is shown at 3, and the interstices are shown at 5.

From a consideration of the foregoing disclosure, therefore, it will be evident that all the initially recited objects of the present invention have been achieved.

Although the present invention has been described in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A method of making a polyurethane foam product, comprising coating preformed particles of comminuted polyurethane foam with a bonding agent comprising a liquid mixture of a polyfunctional reactive hydrogen compound and an organic polyisocyanate, assembling a quantity of said coated particles in a mold, and unidirectionally compressing said coated particles while in said mold in the substantial absence of water to prevent foaming of the reaction product of said reactive hydrogen compound and said organic polyisocyanate, and permitting bonding of said particles in a compressed state and allowing said liquid mixture to react and cure for maintaining said particles in said compressed state.

2. A method as claimed in claim 1, the isocyanato groups being present at least about 2% in excess of the reactive hydrogen, by weight of the isocyanato groups based on the weight of said mixture as a whole.

3. A method as claimed in claim 2, said excess being about 4–10%.

4. A method as claimed in claim 1, said compression substantially closing the interstices between said particles.

5. A method as claimed in claim 1, said particles having a diameter at least principally in the range 1–25 millimeters before compression.

6. A method as claimed in claim 1, and applying heat to said body after the initial compression and during curing of said liquid mixture.

7. A polyurethane foam product prepared by the method of claim 1.

References Cited

UNITED STATES PATENTS

| | | | |
|---|---|---|---|
| 3,050,432 | 8/1962 | Weinbrenner et al. | 260—2.5 X |
| 3,114,722 | 12/1963 | Einhorn | 260—2.5 X |
| 3,133,853 | 5/1964 | Knox | 264—45 |
| 3,193,440 | 7/1965 | Schafer | 264—128 |
| 3,251,916 | 5/1966 | Newnham et al. | 264—128 |

FOREIGN PATENTS

| | | |
|---|---|---|
| 898,271 | 6/1962 | Great Britain. |
| 898,272 | 6/1962 | Great Britain. |
| 920,272 | 3/1963 | Great Britain. |
| 938,868 | 10/1963 | Great Britain. |

DONALD E. CZAJA, *Primary Examiner.*

H. S. COCKERAM, *Assistant Examiner.*